May 19, 1970     H. S. FIELD     3,513,460
METHOD AND APPARATUS FOR THE REMOTE INDICATION OF DATA
Filed April 12, 1965     8 Sheets-Sheet 5
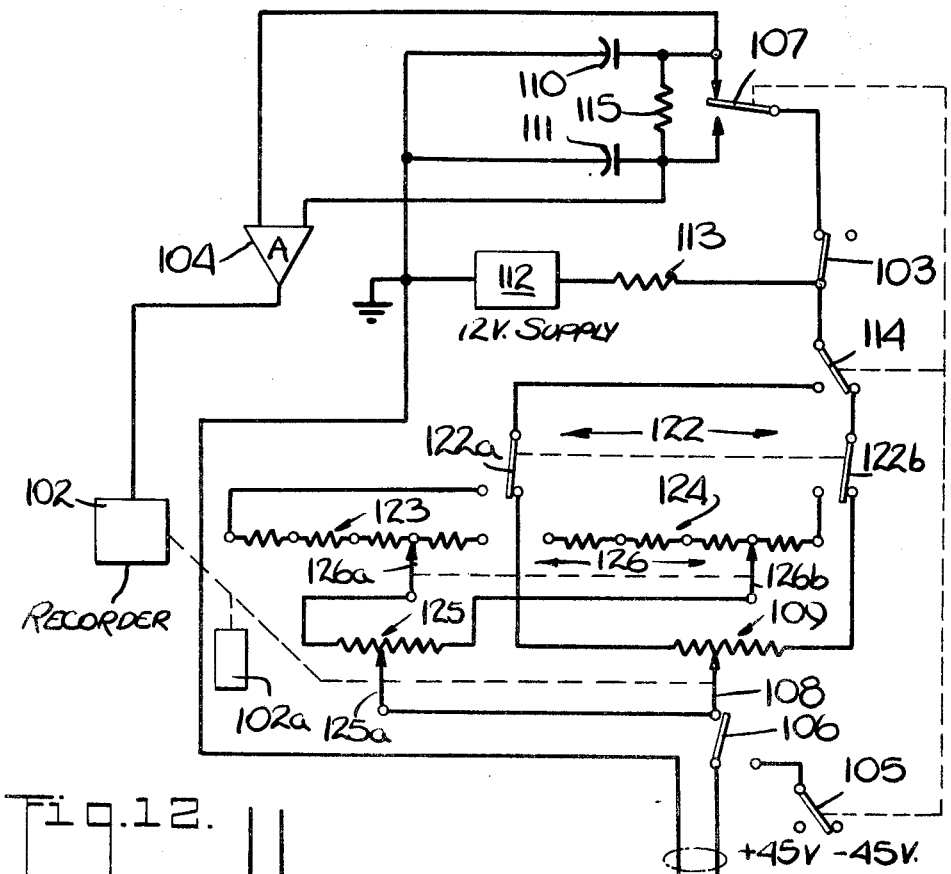
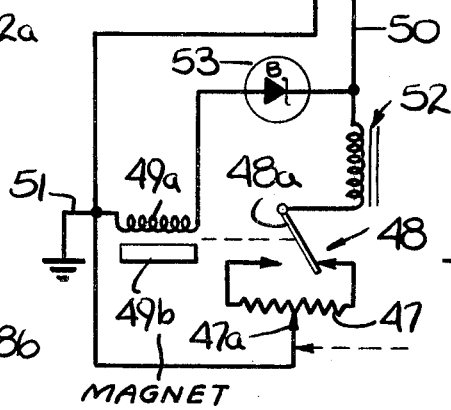
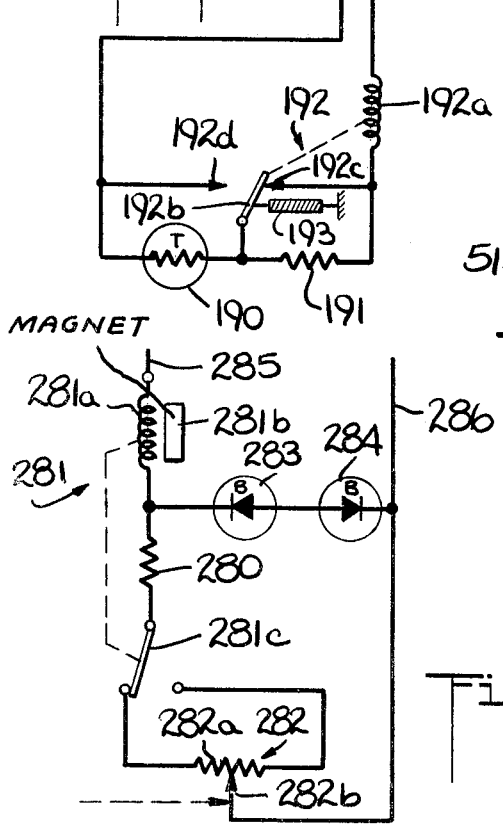
INVENTOR.
HAROLD S. FIELD
BY
Kenyon & Kenyon
ATTORNEYS

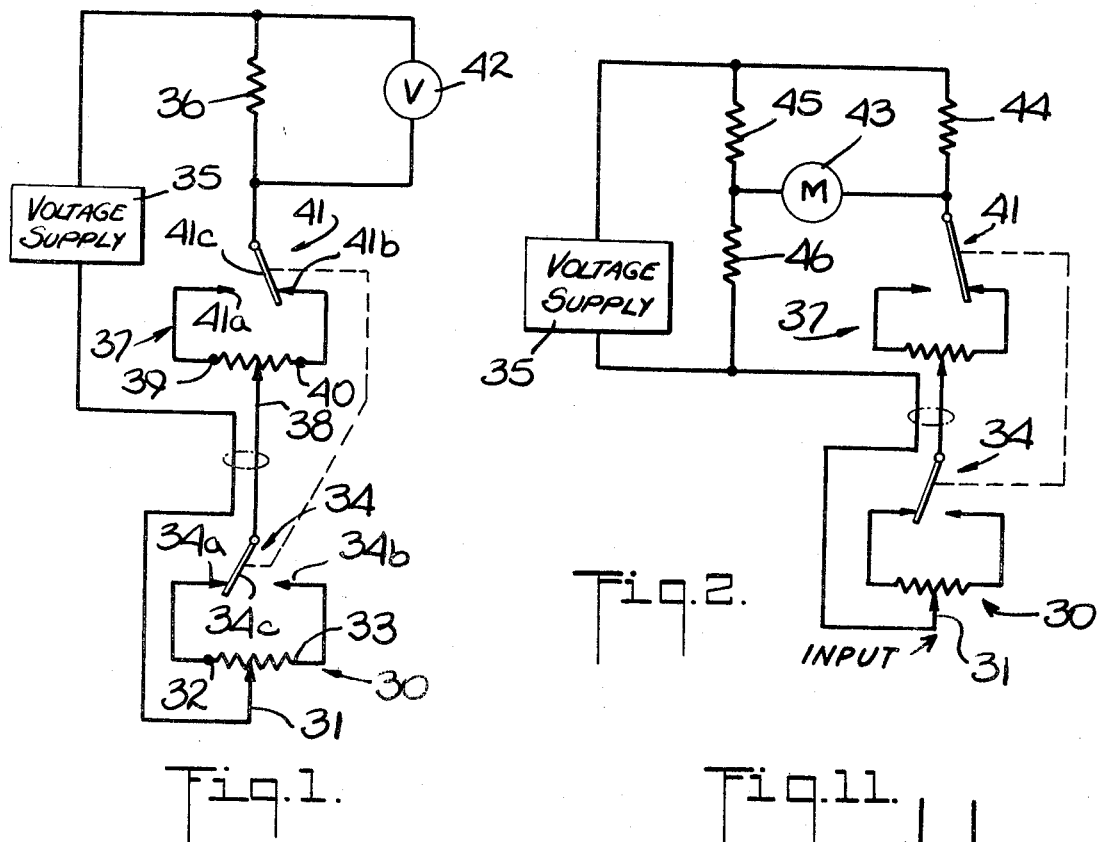
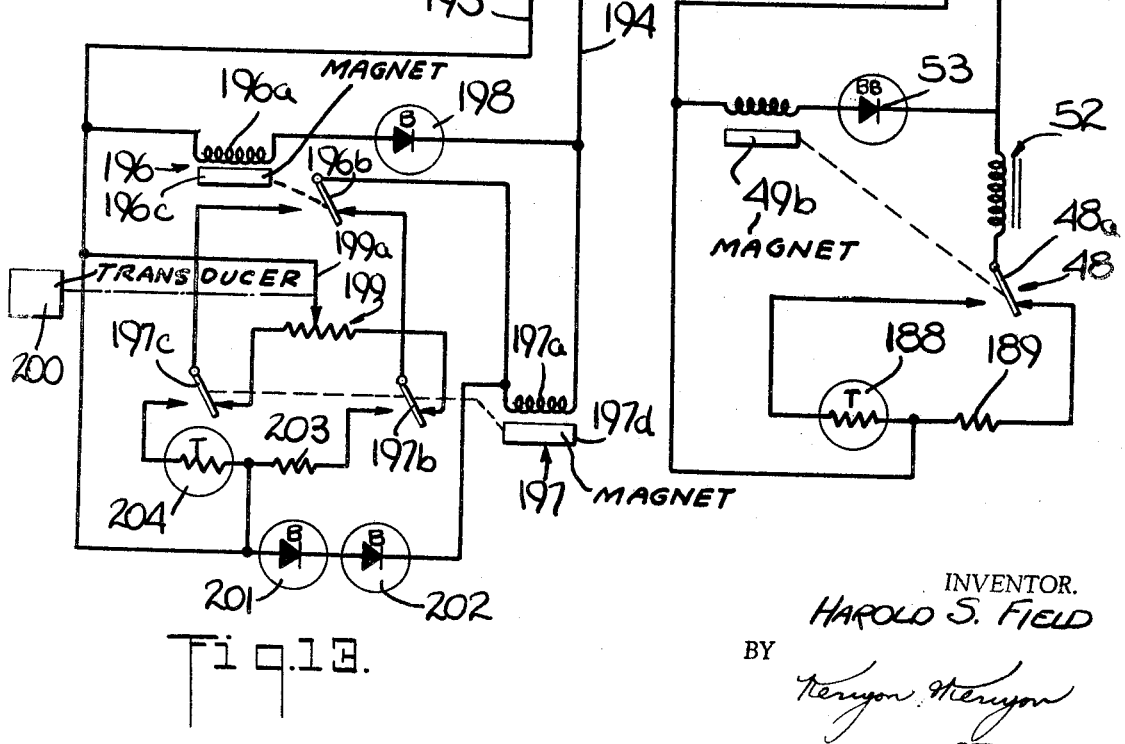

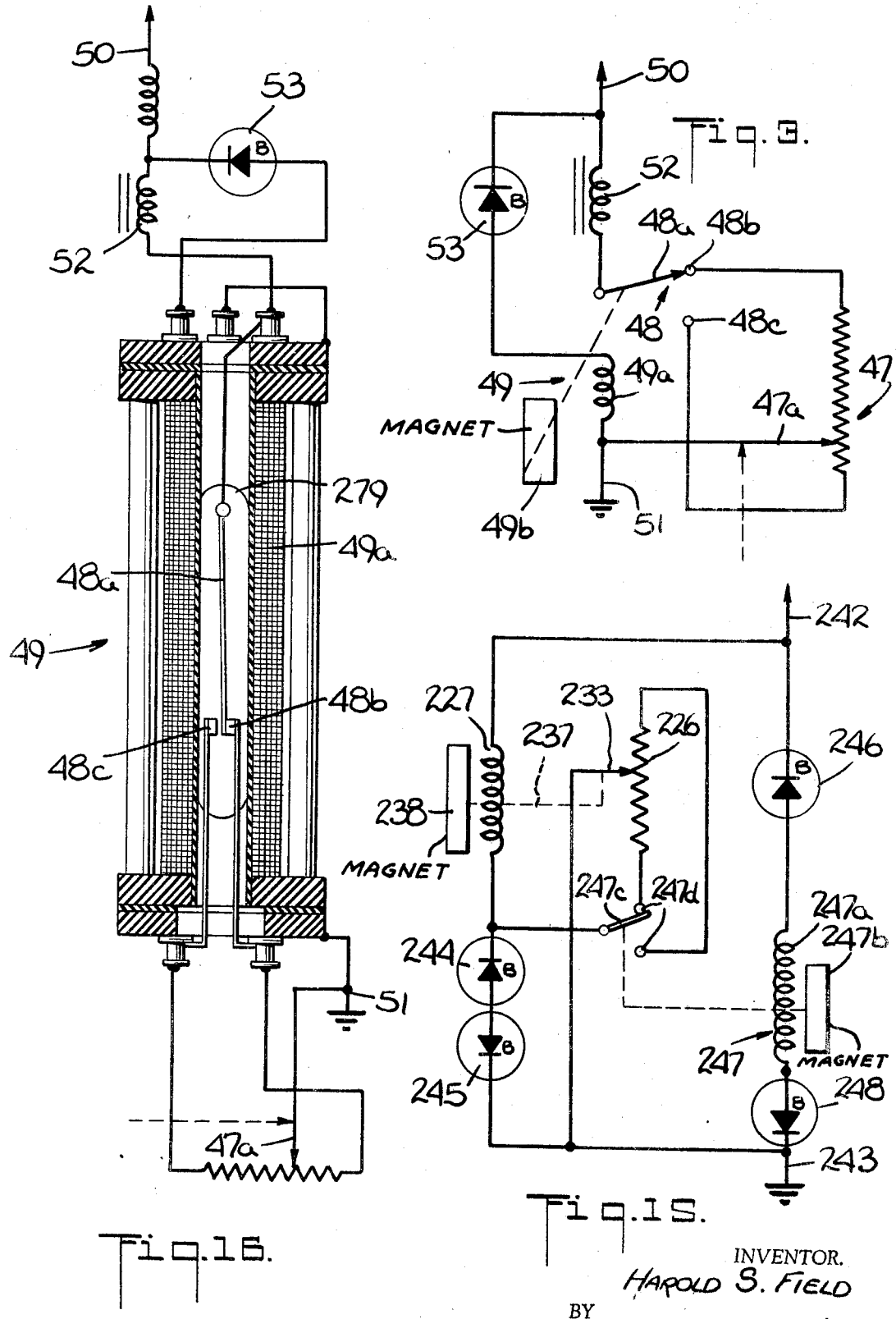

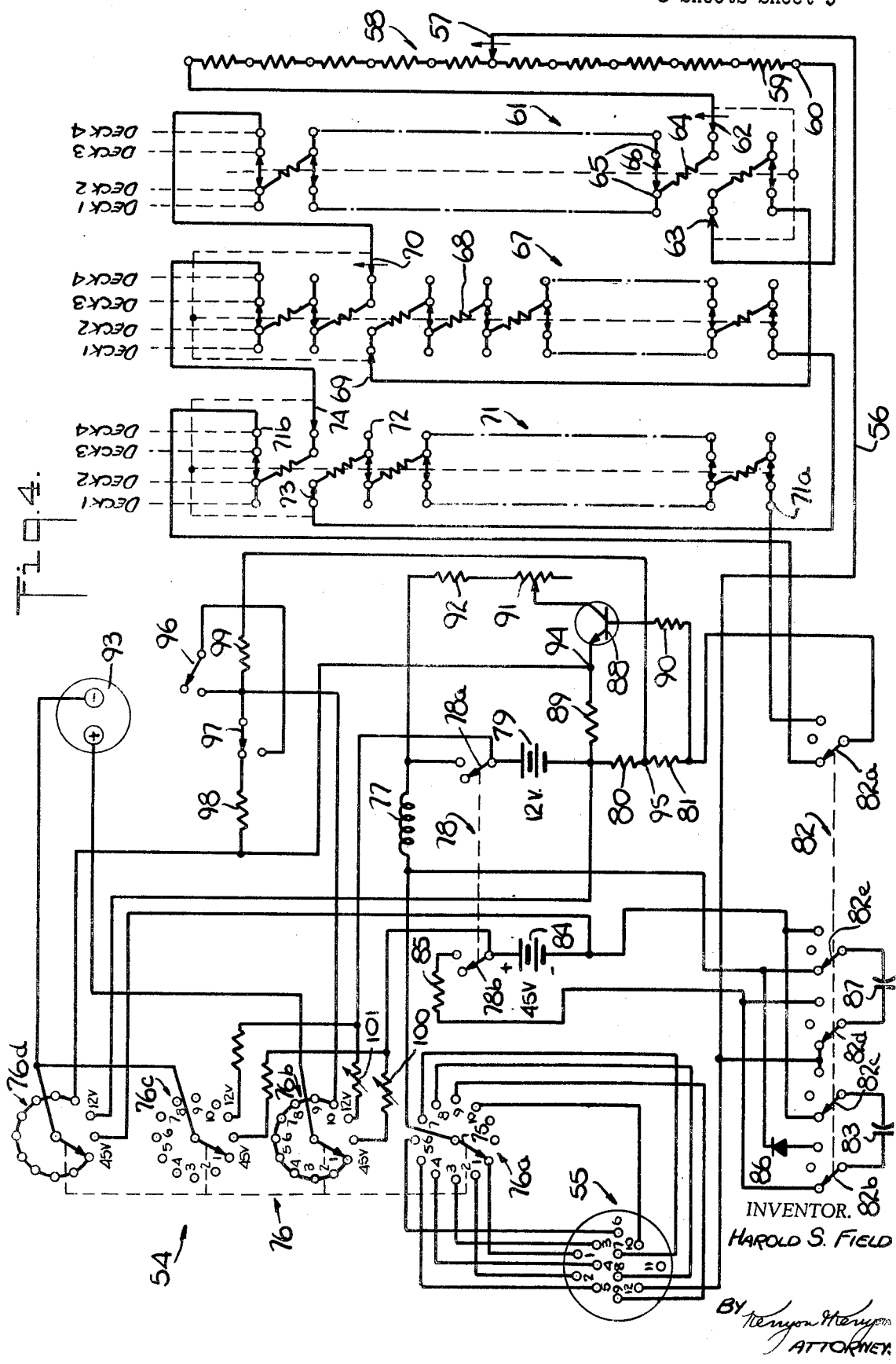

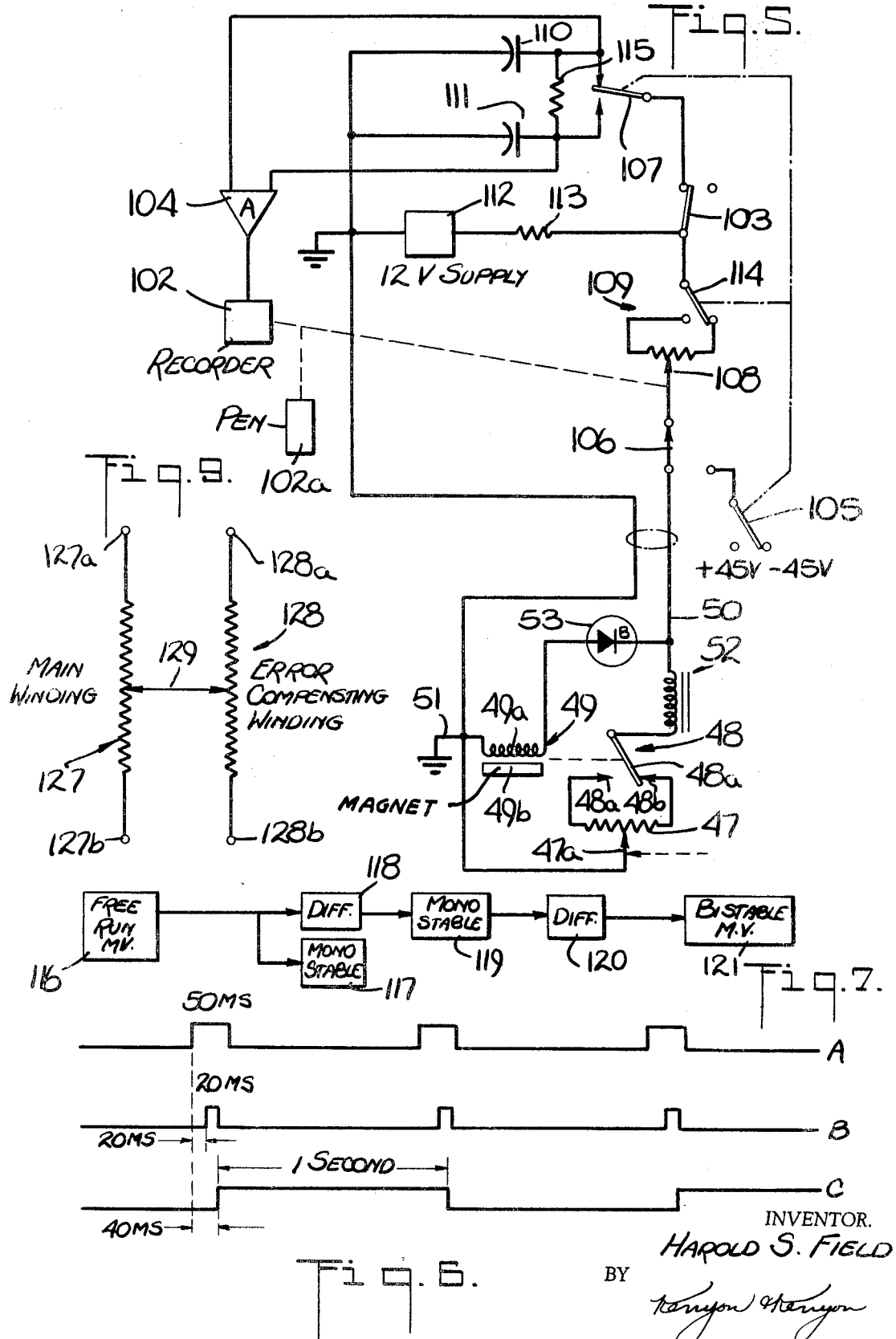

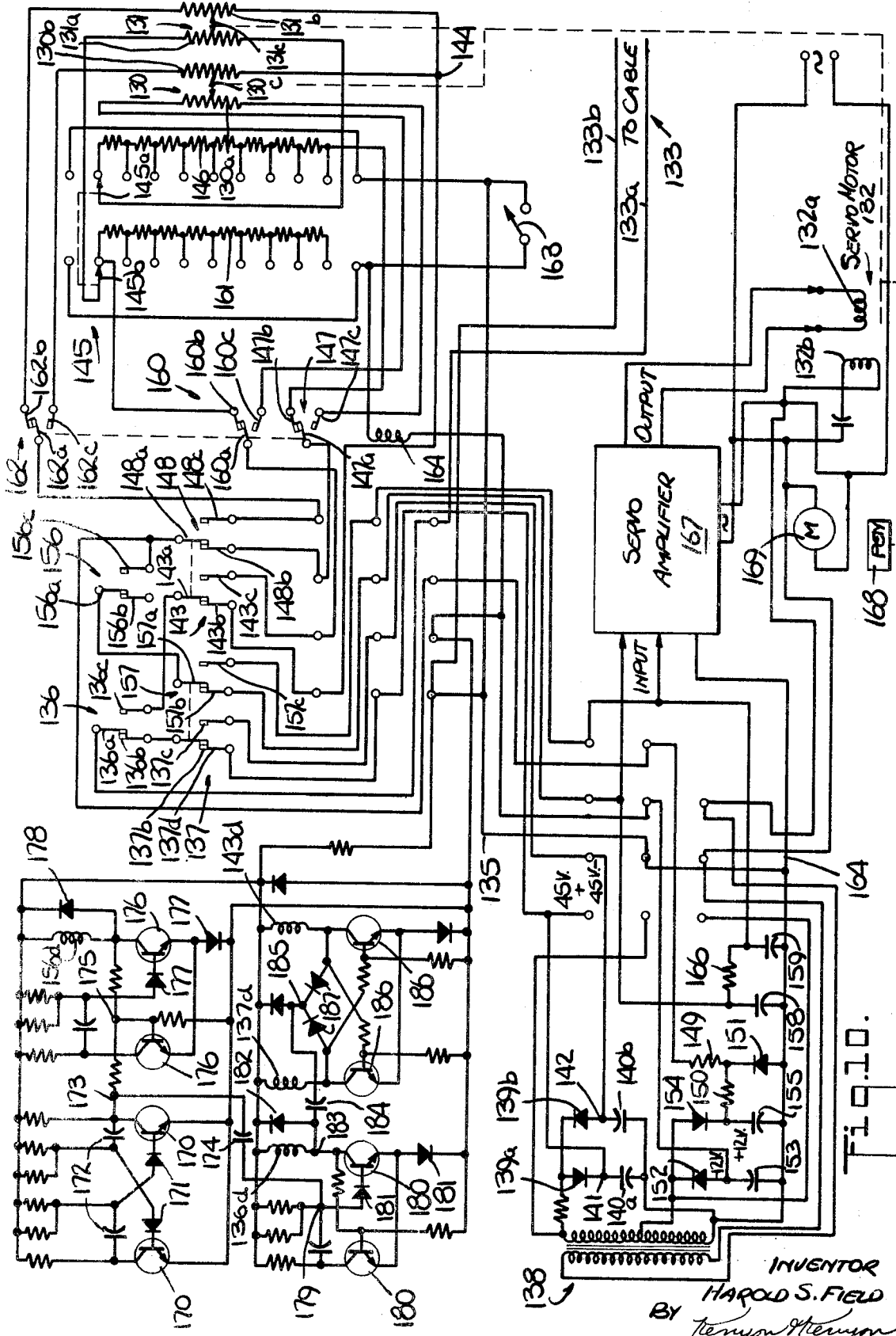

May 19, 1970  H. S. FIELD  3,513,460

METHOD AND APPARATUS FOR THE REMOTE INDICATION OF DATA

Filed April 12, 1965  8 Sheets-Sheet 7

INVENTOR.
HAROLD S. FIELD
BY
Kenyon & Kenyon
ATTORNEYS.

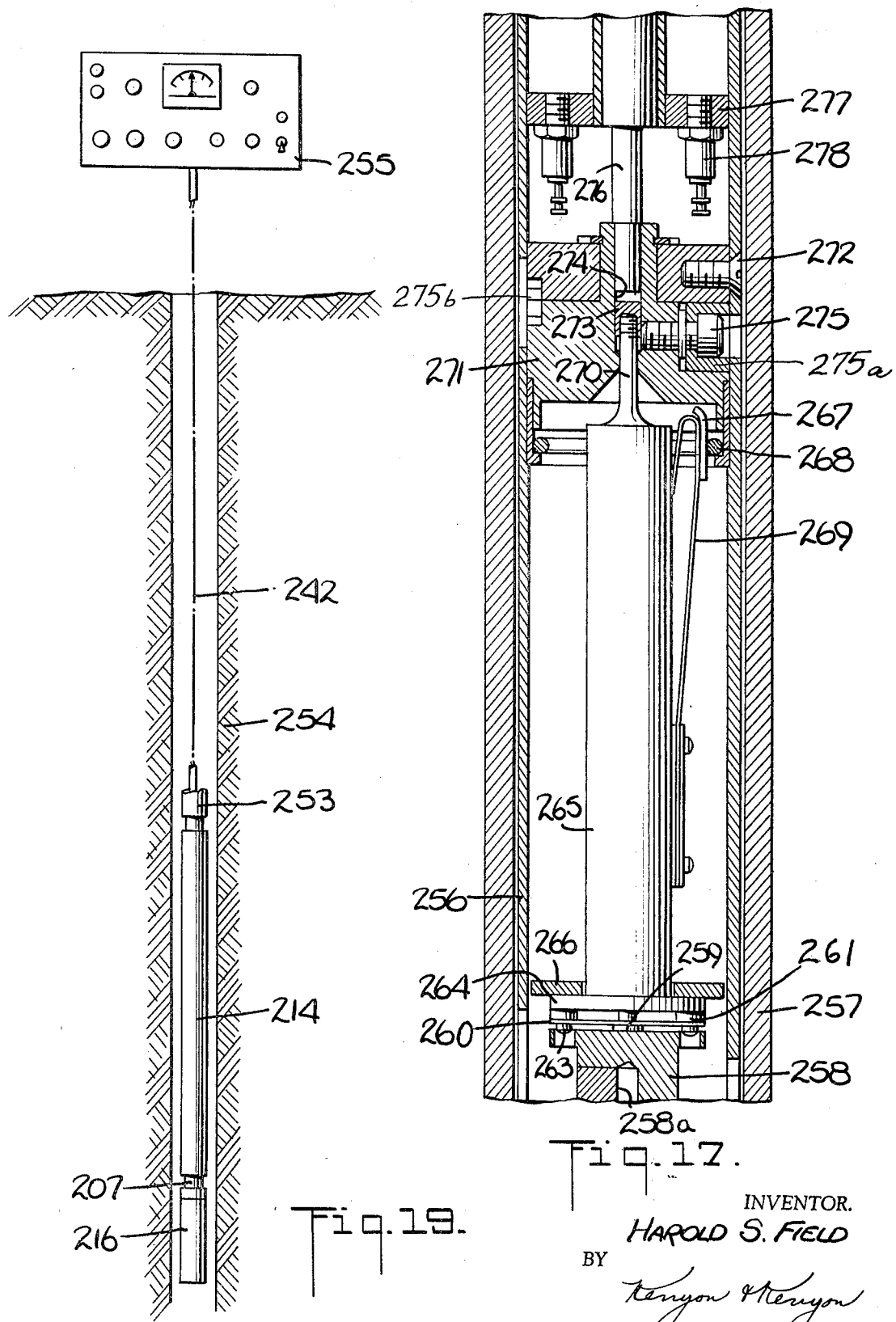

United States Patent Office 3,513,460
Patented May 19, 1970

3,513,460
METHOD AND APPARATUS FOR THE REMOTE INDICATION OF DATA
Harold S. Field, Tulsa, Okla., assignor to Geophysical Research Corporation, New York, N.Y., a corporation of New Jersey
Filed Apr. 12, 1965, Ser. No. 447,233
Int. Cl. G08c *19/04;* H04q *9/06*
U.S. Cl. 340—177
10 Claims

ABSTRACT OF THE DISCLOSURE

Apparatus is disclosed for indicating a change in impedance between the end terminals of an impedance means and an intermediate terminal variably positioned therebetween. The apparatus includes switching means adapted to alternately be positioned between the different end terminals. Means to measure the electrical condition of a circuit measure the impedance between the intermediate terminal and the end terminal in contact with the switch, and as the switch moves to its alternate position to be in contact with the other end terminal the means to measure the electrical condition of a circuit measures the impedance between the end terminal now in contact with the switch and the intermediate terminal. The impedances so measured are then compared. A method for determining the change of impedance between the intermediate terminal of an impedance means variably positioned between end terminals and the end terminals is also disclosed.

---

The invention relates to a system for electrically indicating data and more in particular to a system for electrically indicating data at a remote location without the errors normally encountered in a remote indicating system.

In many electrical systems, it is a common requirement to indicate or record the response or output of an electrical sensing device. The problem of obtaining accurate and reliable data from an electrical sensing device is made more difficult whenever the sensing device is at an appreciable distance from the indicating or recording device. In many indicating systems, it is standard practice for the sensing device to include potentiometer means which is positioned in response to various ambient conditions such as temperature, pressure, etc. In a potentiometer system, a three wire circuit connects the potentiometer of the sensing device to a potentiometer in the indicating equipment. The position of the indicating potentiometer is varied until the three-wire circuit is balanced with respect to the setting of the potentiometer of the sensing device. In this way, the indicating potentiometer can be made to track and thereby indirectly indicate the setting of the sensing potentiometer. Such a system can be operated with a reasonable degree of accuracy where the distances between the indicating potentiometer and the sensing potetiometer are relatively limited, and where they permit calibration of the entire system. However, in many applications where the distance between the sensing and the indicating device is very great, the three-wire circuit can introduce appreciable errors which go to destroy the usefulness of the system.

An example of where a remote indication system can encounter difficulty is in the field of oil or gas well surveying. In sensing the pressure or temperature at various levels with the well, great depths are encountered and, consequently, the three-wire circuit of a potentiometer system must necessarily be of great length. The cable resistance is a function of the temperature in the bore hole. Experience has shown that the electrical characteristics of the cable are significantly changed by the stretching of the cable in response to its own weight when extended over great vertical distances. Furthermore, tests have shown, that in the case of deep wells, the various stray electrical fields within the earth are capable of inducing high voltages in a three-wire system. Such induced voltages can either completely prevent the obtaining of useful signals from the sensing device within the well, or can apply a sufficient error to the signal to make it unreliable and misleading.

Another difficulty encountered when using a potentiometer data system is that the wiper of the movable arm or element of the potentiometer may present a level of frictional force with respect to the windings of the potentiometer which is sufficient to interfere with the accurate response of the transducer which moves the wiper arm. As a result, the friction of the wiper with the windings may prevent movement of the wiper when very small movements of the transducer occur. Consequently, the sensitivity and the response of the system can become unsatisfactory for small changes in the ambient condition being sensed and of questionable accuracy.

In addition to affecting the accuracy of indication, the friction of the wiper upon the windings can induce an excessive rate of wear which is especially undesirable when it is intended to subject the sensing device to the particular environment for a prolonged period of time. In the case of remote indicating systems having a sensing device in a totally inaccessible location such as at the bottom of an oil well, the problems associated with potentiometers have precluded the comparatively permanent installation of sensing units employing them. Thus, the desired procedure of leaving the sensing device in a well for a period of time becomes impractical due to the questionable accuracy and the short life of the potentiometer. As a result, it is generally necessary to go through the costly and time-consuming practice of lowering the sensing device into the well in order to obtain measurement of the conditions therein and then to subsequently remove it.

It is therefore one of the objects of the invention to provide a system for accurately transmitting the output of a sensing device over a great distance.

Another object of the invention is to provide a system for accurately indicating or recording the output of a sensing device at a great distance from it.

It is still another object of the invention to eliminate the effects of the transmission cable and of stray-induced signals in a remote indicating system.

It is an additional object of the invention to provide a remote indicating system in which the indicating device can accurately track the sensing device to obtain accurate data readings.

It is a further object of the invention to eliminate the wear and the errors resulting from the engagement of the transducer-actuated wiper of a potentiometer with windings in a remote indicating system.

It is also an object of the invention to provide an accurate and reliable remote indicating system which employs a two-wire circuit.

In one embodiment of the invention there is included a system for indicating a change in impedance. The system includes an impedance means having a pair of end terminals and an intermediate terminal. The impedance between at least one of the end terminals and the intermediate terminal is variable. Switching means are provided for alternately connecting to a different one of the end terminals. Means are provided for sensing the impedance of a circuit. The system also includes means serially connecting the intermediate terminal and the switching means to the sensing means. As a result, change in the impedance between at least one of the end terminals of the impedance means is indicated as the sensing means is alternately connected to a different one of the end terminals by the switching means.

An advantage of this arrangement is that it enables a two-wire system to indicate the output of a three-terminal impedance means since the switching means alternately connects to a different one of the end terminals of the impedance means. Since the two-wire system is common to both of the switching positions, the same magnitude and sense of error is present for each of the switching conditions and consequently is neutralized by the system.

In another embodiment of the invention, the impedance means includes a potentiometer which is mechanically driven in response to an ambient condition which is to be indicated.

In still another embodiment of the invention, switching means are employed at both the sensing and the indicating ends of the system for alternately placing one end terminal of each of the potentiometers in the two-wire circuit.

In an additional embodiment of the invention, the two-wire circuit is used both for the purpose of indicating the condition being sent, as well as for actuating the switch at the sensing device.

In another additional embodiment of the invention, means are provided for automatically balancing the indicating potentiometer with the sensing potentiometer.

In another embodiment of the invention, a resistor and temperature responsive resistor serve as the sensing element which is to be alternately connected in the two-wire circuit by the switch device adjacent thereto.

In still a further embodiment of the invention, there is provided a decade device for measuring a balance condition with the remote transducer.

In still one other embodiment of the invention, there is provided a sensing device in which the potentiometer thereof has its wipers normally disengaged from its winding until the time when a reading of the potentiometer is to be made.

Other objects and features of the invention will become apparent from the following specification and the accompanying drawings in which:

FIG. 1 is a schematic representation of a two-wire circuit for indicating the position of a potentiometer;

FIG. 2 is a schematic representation of a null-indicating embodiment of the circuit of the invention;

FIG. 3 is a schematic representation of the means for switching a remote potentiometer;

FIG. 4 is a schematic representation of a decade device for indicating the remote sensing device;

FIG. 5 is a schematic representation of a servo device for balancing the two-wire circuit with the transducer potentiometer and for recording an indication of the balanced condition;

FIG. 6 is a graphical representation of the pulses produced by the multivibrator circuit of FIG. 7;

FIG. 7 is a block diagram of a multivibrator circuit for producing pulses for actuating the switching means of the indicating device of the invention;

FIG. 8 is a combined schematic and block representation of the servo system for automatically balancing and recording the output of the sensing or remote potentiometer;

FIG. 9 is a schematic representation of a compensating winding for a main winding of the balancing potentiometer;

FIG. 10 is a detailed schematic representation of the servo for balancing and recording the balance condition of the transducer;

FIG. 11 is a schematic representation of a temperature-responsive sensing device;

FIG. 12 is a schematic representation of a temperature-sensing device adapted for high temperature operation;

FIG. 13 is a schematic representation of a combined temperature and pressure sensing device;

FIG. 15 is a schematic representation of the means for switching the remote potentiometer and for lifting the wiper thereof;

FIG. 16 is a vertical section view of a means for switching the remote potentiometer;

FIG. 17 is a fragmentary vertical section view showing another embodiment of the remote potentiometer of the invention;

FIG. 18 is a schematic representation of another circuit for switching the remote potentiometer; and FIG. 19 is an elevational view of the remote indicating system of the invention disposed in a well bore.

Figure 14:
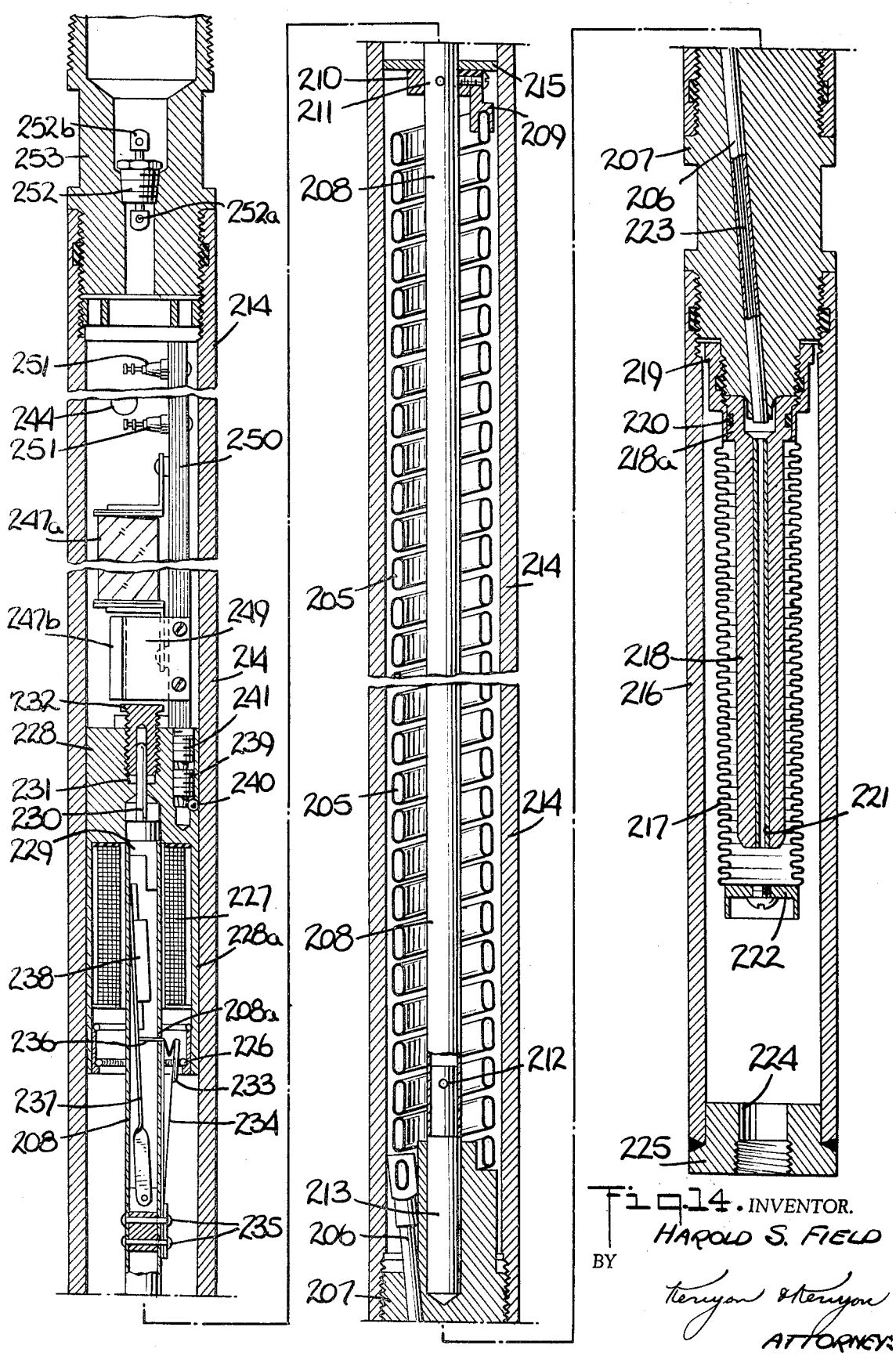
FIG. 14 is a broken vertical section view showing the potentiometer and related elements of the pressure transducer of the invention.

As shown in FIG. 1 of the drawings, the sensing device includes a remote potentiometer 30 which has wiper 31 and has its end terminals 32 and 33 connected to fixed contacts 34a and b of switch 34. As determined by the system in which the sensing device is used, wiper 31 can be manually operated or operated by means responsive to ambient conditions such as a pressure or temperature transducer. Potentiometer 30 is connected by a two-wire circuit which includes voltage supply 35 and resistor 36 to balancing potentiometer 37. Wiper 38 of balancing potentiometer 37 is connected to movable contact 34c of switch 34. End terminals 39 and 40 of balancing potentiometer 37 are connected to fixed contacts 41a and 41b, respectively, of switch 41 which includes movable contact 41c. Voltmeter 42 connected across resistor 36 indicates the magnitude of current flowing in the circuit. Here, it should be noted that the two-wire system, for example, in the case of an oil well survey application, can employ the earth itself or the well casing as one of the two wires in the circuit.

In operation, wiper 31 of remote potentiometer 30 is positioned with respect to the winding of the potentiometer by a transducer (not shown). As shown in FIG. 1, movable contacts 34c and 41c are connected by a dash line to indicate that the two contacts move together, that is to say, one moves whenever the other moves. From the drawing, it can be seen that for a given position of each of the movable contacts, current flows from the voltage supply and through one portion of each of the potentiometers between an end terminal and the wiper. For a given setting of the movable contacts, voltmeter 42 gives an indication of the current through resistor 36. Upon moving each of the movable contacts to their alternate position, the current flows through the other portion of each of the potentiometers disposed between the other end terminal and the wiper. Except for the end portion of each of the potentiometers, all other circuit elements remain common for either condition of the movable contacts. In the alternate position, voltmeter 42 reflects the current flow through the other portions of the poentiometer. If balancing potentiometer 37 does not have its wiper 38 adjusted to a position which corresponds to that of remote potentiometer 30, voltmeter 42 will show different readings for each of the alternate switch positions since the current through resistor 36 will vary. By adjustment of wiper 38 of the balancing potentiometer, potentiometer 37 can be set to correspond to the setting of remote potentiometer 30. At this point, the reading of voltmeter 42 for both of the positions of the pairs of movable contacts will be the same. In this way, the balancing potentiometer can be positioned into correspondence with the position of the remote potentiometer.

Since cable resistance and induced voltages are the same for either switch position, they do not affect the balance point, and consequently, the reading. To increase the accuracy of the system, the balance potentiometer and the remote potentiometer can be made electrically identical or they may be calibrated together. The two-wire system not only enables an earth return path or a well casing to be employed as one of the wires, but also enables a compact and convenient form of electrical cable, such as a coaxial cable, to be employed.

In the arrangement of FIG. 2 of the drawings, a meter or galvanometer 43 indicates when the balancing potentiometer 37 is positioned according to the position of the remote potentiometer 30. The portions of the potentiometers and resistance 44 comprise one leg across voltage supply 35, and resistors 45 and 46 comprise a second leg across voltage supply 35. In setting up the indicating circuit, resistors 44 and 45 can be selected to be of equal value. In the balanced condition for the potentiometers, the total resistance in the leg with resistor 44 is equal to the total resistance of either potentiometer plus the resistance represented by the cable and any induced voltage. Resistor 46 can be made about equal to the total resistance of the potentiometer. The potentiometers have corresponding positions when there is no change in the meter readings obtained by operating switches 41 and 34.

In remote potentiometer 47 shown in FIG. 3, wiper 47a is positioned by a transducer (not shown). Switch 48 having movable contact 48a can alternately connect to fixed contacts 48b and 48c, which, in turn are connected to the end terminals of potentiometer 47. Movable contact 48a is operated by a magnetic latching relay 49, which includes coil 49a and permanent magnet 49b. In FIG. 3, the two-wire circuit includes line 50 leading to the balancing potentiometer and line 51 connected to ground. The path of the measuring current from the voltage source adjacent to the balancing potentiometer (not shown) passes through line 50, choke 52 and through movable contact 48a to one of the fixed contacts and thereby to a portion of potentiometer 47. Wiper 47a completes the circuit through line 51 to ground.

In order to actuate the relay, a positive pulse having an amplitude sufficient to break down Zener diode 53 is applied to line 50 in order to energize relay coil 49a. The breakdown voltage of the diode is selected to be greater than the normal voltage across the diode which corresponds to the measuring current. Following the application of the positive pulse for actuating the relay and the determination of the current flowing through a portion of potentiometer 47, it is necessary to move contact 48a to its alternate position. To accomplish this, a negative pulse is applied to line 50 which opposes the flux of the permanent magnet and, as a result, the spring (not shown) biasing contact 48a returns the contact to its original position. Consequently, a series of alternately positive and negative pulses will cause the relay to alternately connect each portion of the potentiometer into the circuit. Choke or inductor 52 prevents the pulse from being short-circuited whenever wiper 47a is close to either end of the potentiometer 47. Relay device 49 can be of the magnetic latching type having reed contacts.

In order to operate and determine or indicate the position of potentiometer 47, which has been positioned in response to a variable ambient condition, such as pressure or temperature, reading device or reader 54, shown in FIG. 4, can be used. The reader can be employed to indicate one or more remote sensing units such as shown in FIG. 3. Consequently connector 55 is provided with a plurality of connections which are adapted to connect to a number of potentiometer units.

Referring to FIG. 4, connection No. 1 of connector 55 is connected to a line leading to the circuit of FIG. 3, that is line 50 of FIG. 3, this not being shown in the figure. In addition, connector 12 is connected by means not shown to the ground connection or line 51 of the circuit in FIG. 3. Line 56 extending from connection No. 12 is connected to contact 57 of decade device 58. Decade 58 includes ten resistors 59 which are connected to terminals 60. Contact 57 is adapted to be positioned from one contact to the other in order to select a predetermined number of the resistors which are to be serially connected by the terminals. Thus, it can be seen that decade 58 is in the form of a potentiometer and that contact 57 is the wiper of a potentiometer.

Decade 61 includes contacts 62 and 63 which are connected to the opposite ends of decade 58. In addition, decade 61 includes a plurality of resistors 64, which are connected to spaced pairs of contacts 65. Switch arms 66 connect the adjacent pairs of contacts 65 at all locations of the decade with the exception of the location adjacent to contacts 62 and 63. Resistors 64 are each selected to have the same value and, in the case of a decimal system, the resistance of each of resistors 64 is 1/10 of that of resistors 59 of decade 58. As a result, it can be seen that as contacts 62 and 63 are simultaneously positioned in an upward or downward direction as viewed in FIG. 4, resistors 64 are simultaneously added and subtracted from the opposite ends of decade 58.

In a similar manner, decade 67, having resistors 68, is connected by means of contacts 69 and 70 across decade 61. In order to add another decimal place in a manner similar to that of decade 67, decade 71 can be added. This decade, which includes resistors 72 is connected across the opposite ends of decade 67 by means of contacts 73 and 74. Similarly, as in the case of decade 61, resistors 68 and 72 of decades 67 and 71 are selected to be 1/10 of one another so that each decade corresponds to an additional decimal place.

In operating the decade arrangement, the original approximate setting can be made with contact 57 in order to select the ratio of resistor values on each side of the contact. In order to obtain a finer measurement, in the manner of a vernier, decade 61 is employed to add a preselected number of resistances to the opposite ends of decade 58. The vernier effect results from the fact that the resistors of decade 61 are 1/10 of the value of resistors 59 in decade 58. Decades 67 and 71 are then operated in a similar fashion. The desired number of decimal places dictates the desired number of decades to be used.

In order to maintain accuracy in the decade arrangement, resistors 59 of decade 58 have the greatest tolerance, such as plus or minus 1%. Since the resistors of decade 61 are a fraction of those of decade 58, the resistors of decade 61 are selected to be of increased accuracy, such as a tolerance of plus or minus .1%. Further, by way of example, decade 67 can be provided with resistors having a tolerance of plus or minus .02% and finally decade 71 with resistors of a tolerance of plus or minus .01%. Thus, by use of resistors of increasing accuracy, the overall accuracy of the decade arrangement, such as .1% can be maintained.

As indicated above, a ground connection is joined by means not shown in the figure to connection No. 12 on connector 55 is coupled by line 56 to contact 57 of decade 58. The remaining line of the circuit to be measured, that is the line from connector No. 1 on connector 55, is connected through arm 75 of wafer 76a of wafer switch 76 to choke 77. Contact 78a of on-off switch 78 connects choke 77 to battery 79. Resistors 80 and 81 connect the battery to arm 82a of sample switch 82.

In the alternate positions of arm 82a, the arm can connect to one or the other of end terminals 71a and 71b of decade 71. Consequently arm 82a, as it is alternated, connects to one of the decade circuits extending from contact 57 in either direction. Except that the current from battery 79 is alternately caused to flow through a different half of the decade arrangement, it otherwise flows through the same circuit elements at all times, including those of the external circuit connected to connector 55. Thus, the only variable during the switching of arm 82a is that of introducing a different side of the decade arrangement. The analogy of this type of operation can be seen with respect to the circuit of FIG. 1 having movable contact 41c which alternately connects to one of the opposite ends of balance potentiometer 37.

In the arrangement of FIG. 3, a positive pulse must be applied to line 50 having sufficient amplitude to break down Zener diode 53 and energize relay coil 49a which operates contact 48a. In the position shown in FIG. 4, capacitor 83 is connected across battery 84 by means of resistor 85 and switch contact 78b. In this position, capacitor 83 is charged by the battery. When sample switch 82 is actuated to the alternate position from that shown in FIG. 4, contacts 82b and c connect the capacitor across line 56 which leads to connection No. 12 on connector 55 and to choke 77, which is connected to position No. 1 on wafer switch 76a. In this way the capacitor conducts through diode 86 and discharges into the external circuit connected to connector 55, such as the circuit of FIG. 3. Consequently, the positive pulse from the capacitor, after passing through diode 86, breaks down diode 53 and energizes winding 49a, thereby actuating contact 48a. Diode 86 serves to isolate capacitor 83 from battery 79 after the capacitor has discharged.

Capacitor 87 in the position alternate from that shown in FIG. 4, is charged by battery 84 connected thereto by contacts 82d and e. Capacitor 87 is charged while capacitor 83 is being discharged. When contacts 82d and e are placed in the position shown in FIG. 4, capacitor 87 discharges into the circuit leading to position No. 1 on wafer 76a and to connection No. 12 on connector 55. In this way, a negative pulse is applied to the remote circuit, such as that of FIG. 3. The negative pulse, by opposing the field of the permanent magnet, enables the spring biased contact 48a to return to its original position. Since contact 82a is coupled with the remaining contacts of switch 82 and therefore is operated with them, it can be understood that for each charge and discharge cycle of the capacitors, contact 82a is simultaneously being connected to the alternate end connections 71a and b of the decade arrangement.

The base-to-emitter circuit of transistor 88 is connected by resistors 89 and 90 across resistors 80 and 81. The emitter-to-collector circuit of the transistor is connected by rheostat 91 and resistor 92 across battery 79. When the reader of FIG. 4 is connected to a circuit, such as that of FIG. 3, for each position of contact 82a, current flows through one-half of the decade arrangement, resistor 81, resistor 80, battery or source 79, choke 77 and through switch arm 75 of wafer 76a. Consequently, the drop across resistors 80 and 81 varies with the current flowing to the external circuit. At the same time, a signal across resistors 80 and 81, which is the input to transistor 88, results in a variation in the emitter-to-collector current flowing through resistor 89. Since increasing the base-to-emitter voltage tends to saturate the collector current, it can be seen that transients flowing through resistors 80 and 81 can be regulated or suppressed by the circuit of transistor 88. This is done in order to protect output meter 93, such as a microammeter, which is connected at points 94 and 95. Output meter 93 is connected in circuit with wafer switches 76b, c and d. With switches 96 and 97 open, as shown in FIG. 4, resistors 98 and 99 remain in circuit and thereby reduce the sensitivity of meter 93. Moving switches 96 and 97 to their alternate position removes the resistors from the circuit and thereby increases the sensitivity of the meter.

By switching the arms of wafer switches 76b–76d to the position marked "45v," the potential of battery 84 is applied to the meter circuit. Resistor 100 is the required meter multiplier resistor. This tests the condition of the 45v battery. Similar switching provides a check of the 12-volt battery.

When the circuit of FIG. 4 is connected to a sensing circuit such as that of FIG. 3, an indication of the position of wiper 47a of balance potentiometer 47 can be obtained even though great distances separate the potentiometer and the circuit of FIG. 4. In selecting the equipment it is necessary to calibrate the transducer element for operating wiper 47a, that is to determine various points of the condition sensed by the transducer and the position of wiper 47a. With this calibration information, it is then possible to determine the position of wiper 47 at a remote distance by means of the reader of FIG. 4, since the balancing of the decade arrangement directly reflects the position of the wiper 47a. In the test procedure, each of decades 57, 61, 67 and 71 are adjusted for each setting of sample switch 82 until eventually meter 93 reflects the same current for each position of the sample switch. In this manner, at any setting of the sample switch, the fractional portion of potentiometer 47 and the decade arrangement which is conducting current has the same impedance or resistance as does the alternate other portions of the balance potentiometer and decades. Since the two wires connecting the reader to the remote circuit are conducting the same current at the balance condition for either setting of sample switch 82, it can be understood that the effect of the connections between the reader and the remote circuit are neutralized. The digital or vernier arrangement of the decades enables the balance condition to be accurately measured and therefore an accurate indication of the position of wiper 47a can be determined.

In the circuit of FIG. 5, the position of wiper 47a with respect to potentiometer 47 is indicated by the recording of recorder 102. Switch 103 is initially opened to prevent transients from being applied to amplifier 104 connected to recorder 102. Switch 105 is positioned to select the polarity of pulse which is to be applied to cable 50. When switch 105 is connected to the positive source and switch 106 is moved to a position at which it is in circuit with switch 105, a positive pulse is applied through wire 50 causing diode 53 to break down and conduct current through winding 49a. The current then actuates arm 48a and changes the connection to remote potentiometer 47.

Switches 107 and 103 are adapted to be positioned whenever switch 105 is positioned. As shown in FIG. 5, the closing of switch 106 into circuit with wiper 108 of balance potentiometer 109 causes current to flow through a portion of the potentiometer, through switch 103, and through switch 107 which is connected to one of capacitors 110 and 111. As a result, source 112 by way of resistor 113 and switches 103 and 107 begins to charge one of capacitors 110 and 111.

At this point switch 103 is reopened and subsequently switches 105, 107 and 114 are simultaneously moved to their alternate position. The changing of switch 105 to the position shown in FIG. 5 connects the switch to the negative voltage source. At the same time, switch 114 is connected to balance potentiometer 109 as shown in FIG. 5. Consequently, when switch 106 is momentarily connected to switch 105, a negative pulse is applied to cable 50 and this results in the opposing of the latching field of magnet 49b which releases switch 48a. Upon the subsequent closing of switch 106, the circuit connected to cable 50 and including remote potentiometer 47, is applied to battery or source 112 and at the same time, switch 107 couples the other capacitor into circuit with source 112.

The system of FIG. 5 does not include a stable reference from which an error is established. Instead, a balance is established against the memory provided by the capacitors of the current flowing during the previous switching interval. Consequently, the difference in the two capacitor voltages results in an input of voltage to amplifier 104. As a result, the amplifier drives wiper 108 of balance potentiometer 109 toward a position which will result in equal currents flowing during either connection to the ends of the balance potentiometer by switch 114. Thus it can be understood that one capacitor voltage is always related to the present current flowing due to the voltage drop across resistor 113, while the other capacitor voltage is related to the previous current flow in resistor 113.

Resistor 115 connected from capacitor 110 to capacitor 111 provides the necessary system damping by preventing the difference in capacitor voltages from changing at a rate which could exceed the system response. Resistor 115 and capacitors 110 and 111 constitute a π network. This network can be replaced by a T network that is electrically equivalent. In certain cases, the use of the T network may be preferable since only a single capacitor is required.

In operating the circuit of FIG. 5, it is necessary to actuate switches 103, 106 and 48 in a predetermined sequence. By way of example, FIG. 6 shows a time chart of the operating condition of the three switches. Chart A represents a switching sequence of switch 103. At each one-second interval, switch 103 is actuated, that is, opened for a 50 millisecond period. As shown by charts A, B and C, the 50 millisecond period of switch 103 is in advance of the operating sequences in charts B and C. Thus, switch 103 is opened in advance of the operation of switches 106 and 48. This arrangement prevents transients from entering amplifier 104 as the other switches are operated. Following the opening of switch 103, switch 106 is connected to switch 105 and thereby to one of the positive or negative sources in order to operate remote switch 48. The last switch to be operated, that is remote switch 48, has a one-second duty cycle as shown in chart C of FIG. 6.

As shown in FIG. 5, switches 103, 105 and 107 operate together with the one-second duty cycle shown in chart C of FIG. 6. Switch 105 selects the proper polarity to be applied for operating remote switch 48. Switch 114 determines which end of balancing potentiometer 109 is to be applied to memory or storage capacitors 110 and 111 while switch 115 selects which of the memory and storage capacitors are to be charged. Thus, from FIG. 6 it can be seen that the cycle for switch 107 results in the system being inoperative during the 50 milliseconds out of each second during which the switching of switch 103 occurs.

Where switches 107, 103, 114, 105 and 106 are to be controlled by relays, it is necessary to develop control pulses suitable for operating the relays. FIG. 7 shows a block diagram of a system suitable for developing the necessary control signals for operating the relays. The basic time interval is developed by a free running multivibrator 116 which produces a pulse at a predetermined interval which would be an interval of one second for the cycles of operation shown in FIG. 6. Thus, for example, at one second intervals, multivibrator 116 produces an output pulse having, for example, a pulse duration of 20 milliseconds. A pulse corresponding to Chart A of FIG. 6, that is a pulse having a repetition rate of one second and a pulse duration of 50 milliseconds, by way of example, is produced by monostable multivibrator 117 which is triggered by free running multivibrator 116. As shown in FIG. 6, it is desirable to operate switch 106 by a pulse which lags the pulse of Chart A by 20 milliseconds, and at the same time, to have a pulse duration of 20 milliseconds as shown in Chart B. In order to produce the pulses of Chart B, the output of free running multivibrator 116 is passed through differentiating circuit 118. The trailing portion of the output pulse from the differentiating network 118 is employed to trigger monostable multivibrator 119. Monostable multivibrator 119 is conditioned to produce the 20 millisecond pulse shown in Chart B of FIG. 6. In order to produce an additional trigger pulse, the output of multivibrator 119 is passed through differentiating network 120 which drives bistable multivibrator 121. Thus, the trailing portion of the differentiated output of multivibrator 119 triggers multivibrator 121 at approximately a 40 millisecond delay following the output of multivibrator 116.

The system of FIG. 8 is substantially related to that of FIG. 5 in that the same remote instrumentation including remote potentiometer 47 can be employed, the same indicating system based upon memory and storage capacitors 110 and 111 can be employed, and a related system of switches can be utilized. The similarity to the system of FIG. 5 is present as long as switch 122 remains in the position shown in FIG. 8. Thus, with contacts 122a and 122b of switch 122 connected across balancing potentiometer 109, the system of FIG. 8 operates as a self-balancing recorder which is capable of producing a chart by means of pin 102a. When switch 122 is actuated to its alternate position, contacts 122a and b are connected to the end terminals of legs 123 and 124 of resistors. Balancing potentiometer 125 which is connected to arms 126a and b of selector switch 126 is selected to be a fraction of the value of resistance of balancing potentiometer 109, such as the value of about 20%. Since potentiometer 125 has a reduced value as compared to balance potentiometer 109, it can be seen that motor 102 will drive wiper 125a and thereby pin 102a over its complete range which is a mere fraction of the range of wiper 108. Thus where potentiometer 125 is 20% of the value of potentiometer 109, a resistance change, which is a mere 20% of the resistance of potentiometer 109, will effect the complete travel of wiper 125a. The fractional portion of the full-scale which is to be recorded by means of potentiometer 125 can be selected in incremental steps, such as 10% by means of selector switch 126. In this way, the steps can be made to produce an overlap and thereby insure that the recorded plot can always be located away from the edge of the recording chart. In recording with the arrangement of FIG. 8, switch 122 is operated periodically when the expanded scale is being used. As a result, the chart has the expanded scale recording except for very short intervals when the full recording exists. In this way, the portion of the scale which is expanded can be identified.

The balancing potentiometers employed in each of the embodiments of the invention must be uniform and have a high degree of linearity in order that any of the recording or plotting arrangements of the invention can be used with any gauge device, that is any remote potentiometer, without having to calibrate the remote potentiometer and the recorder device in combination. Therefore, it is desirable to maintain each resistor element linear and to have an exact total resistance within the range of about plus or minus .01%. FIG. 9 represents one of the balancing potentiometers of the invention having main winding 127 with end terminals 127a and b. The main winding is wound with care in order not to exceed the desired total resistance and to have reasonably good linearity. Error compensating winding 128 having end terminals 128a and b, is also carefully wound in a manner so that the resistance between terminals 127a and 128a as connected by wiper 129, plus the resistance between 127b and 128b, as connected by wiper 129, is always equal to the desired total resistance. As a result, where each of windings 127 and 128 are wound with a predetermined accuracy, the combined accuracy of the main winding and the error compensating winding becomes the product of the individual accuracies. Thus, where each of the windings 127 and 128 has a 1% accuracy, the accuracy of the combined arrangement is .01%. The slide wires of the balancing potentiometers, whether for the expanded scale of the full scale arrangements, can be built in according with FIG. 9. The main and compensating windings can be wound on coil forms having a helical groove to position the turns.

A further embodiment of the plotter and recorder of the invention is shown in FIG. 10. The arrangement includes balancing potentiometers 130 and 131 having windings 130a, 130b, 131a and 131b, respectively. In addition, balancing potentiometers include wipers 130c and 131c, respectively. Each of the balancing potentiometers includes a main winding and a compensating winding and a compensating winding in the manner discussed with respect to FIG. 9. Wipers 130c ad 131c are driven by servo motor 132. Cable 133 having lines 133a and b is adapted to be connected to a remote potentiometer and its related circuit components such as shown in FIG. 5. Line 133b is connected through terminal 134 to ground line 135. Line 133a is connected to arm 136a of relay 136 which has contacts 136b and c. Relay 136 also includes winding 136d. Contact 136b is connected to an arm of relay 137, which includes contacts 137b and c. Step-down transformer 138 has rectifiers 139a and b and filter capacitors 140a and b connected across its secondary winding. Terminals 141 and 142 of the rectifier arrangement provide positive and negative voltages such as, for example, plus and minus 45 volts. Contacts 137b and c are connected to terminals 141 and 142, respectively, and therefore enable positive or negative impulses to be applied to cable 133 in order to operate the switch or relay across the remote potentiometer, such as relay 48 in FIG. 5.

When arm 136a is connected to contact 136c, line 133a of the cable is connected to arm 143a of relay 143 having contacts 143b and c. In turn, contact 143b is connected to terminal 144 which leads to windings 130b and 131b of the balancing potentiometers. From terminal 144 a circuit is completed as shown in FIG. 10 through winding 131b, wiper 131c, winding 131a to contact 145a of selector switch 145. As determined by the setting of contact 145a, the circuit extends through one or more of resistors 146 to arm 147a of relay 147.

From contact 147b of relay 147 the circuit extends to contact 148b of relay 148 having arm 148a. Arm 148a is connected to resistor 149 which in turn is connected to resistor 150 and diode 151. Diode 152 and capacitor 153, as well as diode 154 and capacitor 155 provide positive and negative voltage sources such as, for example, −12 and +12 volts, respectively. Consequently, arm 148a is connected to the plus voltage source by means of resistors 149 and 150.

Arm 156a of relay 156 is adapted to connect to contacts 156b and c. In turn, arm 156a is connected to arm 157a of relay 157 having contacts 157b and 157c. When arm 156a is connected to contact 156d, arm 157a becomes connected to the voltage source provided by diode 154 and capacitor 155. In turn, contacts 157b and 157c are connected to memory capacitors 158 and 159. As determined by the setting of switch arm 157a, either of the memory capacitors is charged in response to the voltage across resistor 149.

With the setting of the switches as shown in FIG. 10, the portion of potentiometer 131 beneath wiper 131c is connected in the balancing circuit. Upon the actuation of relay 143, arm 143a is connected to contact 143c. At the same time arm 138a is activated along with arm 143a. As a result, the cable connected through arm 136a and contact 136c is connected to contact 143c. In turn contact 143c is connected through arm 160a of relay 160 to contact 160b. Contact 145b of selector switch 145 connects contact 160b through one or more of resistors 161 of the upper portion of winding 131a of potentiometer 131. The circuit extends through wiper 131c and the upper portion of winding 131b to contact 162b of relay 162. Arm 162a is connected to contact 148c and thereby to the source of plus voltage at resistor 149.

In this way it can be seen that the operation of relay 143 enables either half of the windings of potentiometer 131 to be sequentially placed in circuit. This function corresponds to the operation of switch 114 in the circuit of FIG. 5 which enables a different portion of potentiometer 109 to be sequentially connected to a different portion of potentiometer 47. Thus potentiometer 131 having the compensating winding is operated in a manner similar to potentiometer 109 in FIG. 5 with the exception that selector switch 145 enables a greater or lesser portion of resistors 146 or 161 to be introduced into the circuit in order to expand the scale at the indicating or recording device.

Relays 147, 160 and 162 when actuated from the position shown in FIG. 10 enable selector switch 145 and resistors 146 and 161 to be eliminated from the circuit when it is desired to indicate the setting of potentiometer 130 without the expanded scale feature. Therefore in considering the circuit for eliminating the expanded scale feature, arms 147a, 160a and 162a should be visualized as being connected to contacts 147c, 160c and 162c, respectively. As a result, it can be seen that contact 143b is connected through terminal 144 to winding 130b, wiper 130c and winding 130a at the lower portion of the potentiometer 130. The circuit then continues through contact 147c, arm 147a to contact 148b, which leads to the positive source at resistor 149. In the alternate position of relays 143 and 148 from that shown in FIG. 10, contact 143c is connected through arm 160a, contact 160c, winding 130a, wiper 130c and winding 130b of the upper portion of potentiometer 130. The circuit then continues through contact 162c, arm 162a to contact 148c, which leads to the positive source at resistor 149. In this way the upper and lower portion of potentiometer 130 is sequentially placed in circuit with an alternate portion of the remote potentiometer similar to the circuit of FIG. 5.

Switch 163, which can be a microswitch, is connected at one side to ground line 135 and at the opposite side to winding 164 which is connected to the negative source at diode 152. Winding 164, when energized, actuates relays 147, 160 and 162 from the position shown in FIG. 10. Thus, with switch 163 normally open and relays 147, 160 and 162 in the position shown in FIG. 10, the expanded scale is employed. However, when it is desired at least on a momentary basis, to eliminate the expanded scale and to provide a direct reading scale, switch 163 is closed. Consequently a recording of the expanded scale can normally be obtained with the exception that for short intervals when switch 163 is closed, the direct scale is shown. This provision enables the portion of the scale which is expanded to be identified on the recording.

Arm 156a, when connected to contact 156c, connects arm 157a into circuit by means of arm 148a with a portion of one of potentiometers 130 and 131. In turn, arm 157a completes a circuit from resistor 149 and through either contact 157b or 157c to capacitors 158 and 159, respectively. As a result, as relay 157 is sequentially operated, one of capacitors 158 and 159 is connected in circuit to resistor 149, while the other remains at the charge level previously applied to it. This condition of remaining at a charge level is the memory function of the capacitor. Thus at any given time resistor 166 is subjected to the difference in potential of the capacitor connected in circuit with resistor 149 and the capacitor in the disconnected or memory condition. As a result an error voltage is established across resistor 166 which reflects the degree to which either of potentiometers 130 and 131, which are currently in the circuit, fails to correspond to the setting of the remote potentiometer. In addition it can be seen that the error voltage across resistor 166 can be established without the need of a stable reference, since the charge or voltage of the memory capacitor at a given setting serves as a momentary reference.

The voltage across resistor 166 serves as the input to servo-amplifier 167. The output of the amplifier is connected across control winding 132a of servo-motor 132, which includes fixed winding 132b. As shown by the dash lines in FIG. 10, servo-motor 132 is mechanically connected to wipers 130c and 131c in order that the response of the servo-motor to the amplified error signal from the servo-amplifier drives the wipers of the balancing potentiometers. This function enables the balancing potentiometer currently in circuit to be driven to a setting corresponding to the setting of the remote potentiometer. The drive to the balancing potentiometers is also connected to pen 168, which is adapted to record on a chart (not shown). Motor 169, which is connected across the AC power line drives the chart for pen 168.

The block diagram in FIG. 7 represents the system for controlling the various relays shown in FIG. 10. FIG. 6 includes charts representing the pulses which are applied to certain of the circuit elements shown in the upper left hand portion of FIG. 10. Transistors 170 in conjunction with diodes 171 and capacitors 172 comprise a free-running multivibrator which is represented as block 116 in FIG. 7. The free-running multivibrator is conditioned to produce a signal output at a predetermined time interval, such as, for example, a 20 millisecond pulse every second. The output of the free-running multivibrator which appears at terminal 173 is connected to input terminal 175 of a monostable multivibrator which includes transistors 176 and diodes 177. The monostable multivibrator, such as shown as block 117 of FIG. 7, is conditioned to produce a single pulse of a predetermined duration for each of the pulses delivered at the terminal 173. Thus, for example, as shown in Chart A of FIG. 6, for every output pulse from the free-running multivibrator, the monostable multivibrator produces a pulse having a duration of about 50 milliseconds.

The output pulse of the monostable multivibrator is applied to winding 156d which actuates relay 156, thereby causing arm 156a to connect to contact 156c. Diode 178 is connected across relay winding 156d to prevent voltage reversal across the winding. As previously discussed, the actuation of arm 156a to contact 156c enables one or the other of the memory capacitors 158 and 159 to be connected in circuit.

The output of the free-running multivibrator is also connected to capacitor 174 which serves to differentiate the output and connect it to input terminal 179 of a monostable multivibrator including transistors 180 and diodes 181. Capacitor 174, as a result of the differentiation, converts the pulse from the free-running multivibrator into short pulses or spikes corresponding to the leading and trailing edges of the pulse from the free-running multivibrator. The output of the capacitor corresponding to the trailing edge of the output pulse from the free-running multivibrator has an inverted sense or polarity as compared to the pulse corresponding to the leading edge. The inverted pulse is adapted to trigger the monostable multivibrator including transistors 180. The output of the monostable multivibrator is applied to winding 136d of relay 136. Diode 182 is connected across winding 136d.

Scale B of FIG. 6 shows a representation of the pulse output applied to winding 136d. The energization of winding 136d serves to actuate arm 136a to engage contact 136c so that the cable from the remote potentiometer is connected to the circuitry leading to the balancing potentiometers.

The output of the monostable multivibrator including transistors 180 at terminal 183 is connected to capacitor 184 which serves to differentiate the output signal. The differentiated signal is applied to terminal 185 of the bi-stable multivibrator which includes transistors 186 and diodes 187. The monostable multivibrator including transistors 180 and capacitor 184 are shown as blocks 119 and 120, respectively, in FIG. 7. The output of the differentiating circuit consists of pulses of different polarity corresponding to the leading and trailing edges of the output of the monostable multivibrator including transistors 118.

The bi-stable multivibrator has windings 137d and 143d connected thereto as loads and includes transistors 186 which are adapted to switch in response to the spike or portion of the pulse from the differentiating capacitor 184 corresponding to the trailing edge of the pulse output of the monostable multivibrator at terminal 183. The bi-stable multivibrator will change states at intervals corresponding to the period of the free-running multivibrator including transistor 170. That is, for example, the time duration of one second, such as is shown in scale C of FIG. 6.

The energizing of winding 137d actuates switch arm 137a which is adapted to apply one or the other of the polarities of the power source from terminals 141 and 142 for switching the relay across the remote potentiometer. At the same time, the energizing of winding 137d operates switch arm 157a connected to switch arm 137a and thereby determines which of the timing capacitors are to be connected in circuit. On the alternate cycle of the bi-stable multivibrator including transistors 186, winding 143d is energized. The actuation of arm 143a by winding 143d in conjunction with arm 148a connected to arm 143a results in the upper or the lower portion of one of the balancing potentiometers being placed in circuit with the memory capacitors 158 and 159. Consequently, the control of windings 137d and 143d serves to make the proper connection for reference resistor 149, selects the proper polarity for the switching pulse to be applied to the remote switch for the remote potentiometer, and reverses the memory and storage capacitors in the input circuit of the servo-amplifier. As shown by the charts in FIG. 6, the entire system is inoperative during the 50 milliseconds out of each second during which the switching is accomplished.

As discussed with respect to the circuit of FIG. 5, it has been indicated that wiper 47a of remote potentiometer 47 can be positioned by various transducers such as those responsive to pressure or temperature. In the case of temperature, it is possible to employ transducers which have a varying electrical output rather than a mechanical one, such as by the use of a thermistor element. FIG. 11, the remote circuitry which corresponds to that shown in FIG. 5 relating to remote potentiometer 47, includes thermistor 188 connected to resistor 189. Here switch 48 serves to sample or connect into circuit, in a sequential manner, either one of thermistor 188 or resistor 189. The balancing potentiometer arrangement, including potentiometer 108 such as shown in FIG. 5, can be used to indicate the temperature environment adjacent to thermistor 188.

Where the temperature to be sensed is at a level which is excessive for the use of a diode, such as a temperature level above about 350° F., the circuit of FIG. 12 can be used. The circuit includes thermistor 190 connected to resistor 191. Relay coil 192a of relay 192 is connected in series with one of the lines of the cable leading to the remote indicator or recorder. Arm 192b of relay 192 is biased by spring 193 toward contact 192c. A pulse having the same polarity as the gauge current can move arm 192b against the spring force toward contact 192d. At this point, the gauge current is sufficient to hold the contact even after the removal of the actuating pulse. In order to return arm 192b to contact 192c, the gauge or measuring current can be interrupted, thereby enabling the spring to return the arm to its initial position.

FIG. 13 shows a combination gauge device capable of indicating a remote temperature condition as well as another variable such as pressure. Lines 194 and 195 are connected to the combination gauge. The gauge includes magnetic latching relays 196 and 197, each of which are similar to the magnetic latching relay of FIG. 5. Each of the relays is biased by a spring (not shown) into the position shown in FIG. 13. Zener diode 198 connects winding 196a across the lines. A circuit can be completed from line 194, through winding 197a, through arm 196b, through arm 197b, through the right hand portion of potentiometer 199, and on to line 195. Potentiometer 199 can have its wiper 199a positioned by transducer 200, such as a pressure transducer.

Upon the application to line 194 of a positive pulse having sufficient amplitude to break down and to conduct through Zener diode 198, winding 196a develops sufficient force to overcome the bias spring tension and to move arm 196b so that it connects to arm 197c. As a result, the circuit from line 194 is then extended through winding 197a, arm 196b, arm 197c, and the left hand portion of potentiometer 199, and onto line 195. In this way, each portion of the potentiometer, as determined by the position of wiper 199a, can be connected to the reader or recording equipment coupled to lines 194 and 195 in the manner previously discussed with respect to the arrangement of FIG. 1. The positive pulse which actuates relay 196 is accompanied by the latching of the relay by permanent magnet 196c.

Due to the provision of the serially connected pair of Zener diodes 201 and 202, the positive pulse for actuating relay 196 is insufficient to actuate relay 197. With arm 196b considered to be connected to arm 197c and as a result of the actuation of relay 196, it can be understood that a positive pulse of sufficient amplitude to break down Zener diodes 201 and 202 will result in the actuation of relay 197. Upon actuation, permanent magnet 197b latches the relay against a spring bias (not shown) so that arms 197b and 197c remain connected to resistor 203 and thermistor 204, respectively. At this point, a circuit is completed from line 194 through winding 197a, through arms 196b and 197c, through thermistor 204, and onto line 195.

Upon the application of a negative pulse to line 194 having sufficient amplitude to enable winding 196a to overcome the flux produced by permanent magnet 196c, the spring bias returns arm 196b to the right as shown in FIG. 13. The same negative pulse, however, is insufficient to conduct sufficient current through the pair of diodes 201 and 202 so that relay 197 does not unlatch. As a result, a circuit is formed which extends from line 194, through winding 197a, through arm 196b, through arm 197b, through resistor 203, and onto line 195. Consequently, it can be seen that thermistor 204 and resistor 203 can be sequentially applied to lines 194 and 195 in the manner discussed with respect to the circuit of FIG. 11.

In order to return the circuit to the configuration shown in FIG. 13, a negative pulse having an amplitude sufficient to conduct current through Zener diodes 201 and 202 must be applied. The current pulse can then actuate relay 197, that is to say, overcome the flux of permanent magnet 197b so that relay 197 can return to the state shown in FIG. 13. In this way the positive pulses of two different amplitudes and negative pulses of two different amplitudes are capable of cycling the combination gauge of FIG. 13 through its four stages of operation.

A pressure sensing device which is adapted to be used with the indicator or recording systems of the invention is shown in FIG. 14. The sensing device of FIG. 14 can be used in high-pressure environments such as those encountered within deep wells such as oil or gas wells. The pressure transducer includes helical Bourdon tube 205 which is held stationary at the lower end thereof by being connected to pipe 206 extending through support 207. Torque tube 208 extends through the open interior of the Bourdon tube. The upper sealed end portion of the Bourdon tube is connected by coupling 209 to collar 210 which is secured to torque tube 208 by pin 211. The lower end portion of the torque tube is secured by pin 212 to stud 213 which is fixedly mounted in support 207. The circumferential deflection of the Bourdon tube in response to internal pressure is reflected by circumferential movement of coupling 209 which in turn twists torque tube 208 as it rotates with the coupling. The torque tube is piloted with respect to the inside surface of housing 214 prior to final assembly by disc 215 which has a small radial clearance with the housing.

The threaded engagement of support 207 with housing 214 seals the interior portion of the housing. The lower end portion of support 207 is threadedly engaged to shield 216 which encloses bellows 217. Bellows 217 which is of a metallic construction is secured to base portion 218a of spacer 218 extending along the length of the bellows. Base portion 218a is threadedly engaged to sleeve 219 and sealed with respect thereto by O-ring 220. In turn the sleeve is mounted by threads on the lower portion of support 207.

The interior portion of bellows 217 is connected by bore 221 extending through spacer 218 to the interior of pipe 206. With the lower end portion of the bellows sealed by cap 222, it can be seen that a closed system is maintained from the bellows, through the spacer and pipe to the interior of the Bourdon tube. The closed system is filled with fluid, such as oil, so that the response of the bellows to increasing pressure is hydraulically transmitted to the Bourdon tube and results in its circumferential deflection.

The pressure environment in which the transducer of FIG. 14 is disposed may include a varying pressure level of a pulsating nature. Such pulsations can subject the Bourdon tube to undesirable operating conditions by stressing it in a pulsating manner. To counteract the effects of pulsation in the pressure environment, bore 221 and the passage within pipe 206 present a degree of fluid damping. Experience has shown that in order to control the degree of damping which is provided chiefly by pipe 206, an extremely fine bore may be required for pipe 206. Such a bore is difficult to control during manufacture and can introduce undesirable surface effects with respect to the fluid. In accordance with the invention, it has been discovered that a filament or wire of predetermined diameter can be mounted extending through the interior of pipe 206 in order to control the damping. Thus, for example, pipe 206 can be provided with a standard size bore and then wire 223 of a selected diameter can be provided to control the degree of damping. The effect of mounting the wire within pipe 206 is to form an elongated orifice having the form of a hollow cylinder. In operation, the pressure of fluid such as liquid or gas to be applied to the pressure transducer of FIG. 14 is admitted to the interior of shield 216 by opening 224 in cap 225.

The upper end portion of torque tube 208 extends through toroidal potentiometer 226 and solenoid 227 mounted in sleeve portion 228a of support 228. The upper end of torque tube 208 is provided with plug 229 upon which is mounted pivot 230. The pivot is supported with the minimum degree of friction by jewel bearing 231 which is secured in supports 228 by retainer 232. Consequently, a minimum of restraint is applied to the torque tube when it is torsionally deflected by the displacement of the upper end of Bourdon tube 205.

Wiper 233 is biased into contact with potentiometer 226 by reed 234 mounted by rivets 235 on the torque tube. The wiper is provided with resilient ligament 236, which extends through opening 208a in the torque tube and is connected to actuator arm 237. Arm 237 is provided with permanent magnet 238 mounted adjacent to its free end. In conjunction with solenoid 227, arm 237 and permanent magnet 238 operate as a magnetic latching device. The resiliency of arm 237 normally holds wiper 233 away from, but at a close spacing to, potentiometer 226.

It can be seen from FIG. 14 that upon assembling the device, the initial rest position of wiper 233 is determined by the position of Bourdon tube 205. Consequently, in order to place the wiper in an initial predetermined relationship with potentiometer 226, it is necessary to position the potentiometer circumferentially with respect to the wiper. This is accomplished by rotating support 228 within housing 214. Once the support has been placed in its proper position, it can be locked with respect to the housing by means of set screw 239 which cams ball 40 against the housing. Screw 241 serves to lock the set screw in the final position.

The electrical circuitry for transducer of FIG. 14 is shown in FIG. 15. Cable 242 leads to the indicating or recording equipment similar to that previously described. The other half of the circuit of FIG. 15 is completed through ground connection 243. Wiper 233 of potentiometer 226 is attached to actuator arm 237. The winding of potentiometer 226 is toroidal in form. The turns of the winding are spaced apart from one another and are accurately positioned in order to provide good linearity.

Where the transducer is to be subjected to a pressure environment for a prolonged period of time, it is undesirable to have the wiper continually in engagement with the potentiometer windings, since vibration or constant pressure fluctuations can cause wear of the potentiometer windings and the wiper surface. Therefore, whenever the pressure transducer is not actively engaged in delivering pressure readings, actautor arm 237 holds wiper 233 clear of the winding of potentiometer 226. Actuator arm 237, solenoid 227 and permanent magnet 238 form a magnetic relay latching device which enables the wiper to be latched for prolonged periods free of the potentiometer winding.

The application of a positive pulse having predetermined amplitude to cable 242 breaks down Zener diode 244 and passes through Zener diode 245 to the ground connection. The pulse is sufficient to overcome the latching capability of permanent magnet 238 so that the wiper is placed into engagement with the winding of potentiometer 226. The positive pulse is sufficient also to break down Zener diode 246 so that current passes through winding 247a of magnetic latching relay 247. Diode 248 completes the circuit from winding 247 to the ground connection. Relay 247 further includes permanent magnet 247b and contact arm 247c which is adapted to alternately connect one of fixed contacts 247d. The arrangement of arm 247c and fixed contacts 247d is similar to the contact arrangement shown for the magnetic latching relay shown in FIG. 16 in which the arm and the pair of fixed contacts are enclosed in a sealed envelope.

As shown in FIG. 14, winding 247a of the magnetic latching relay 247 is mounted upon support 249 which in turn is attached to support bar 250. Terminals 251 support each of the Zener diodes such as diode 244 as well as the wiring connections (not shown) which extend from terminal 252a of insulated bushing 252 to winding 247a, solenoid 227, and the various switch contacts related thereto. The cable leading to the indicating or recording equipment connects to terminal 252b and it can be seen that the ground or return circuit can extend through housing 214 and end coupling 253.

The reversal of arm 247c in accordance with the method of measurement of the invention, is accomplished by alternately passing a predetermined negative pulse through winding 247a by breaking down diode 248. The negative pulse for breaking down diode 248 and for actuating magnetic relay 247 is selected to be insufficient to break down diode 245 so that wiper 233 remains in contact with the winding of potentiometer 226 throughout the cycling of arm 247c. Thus, a sequence of positive and negative pulses can be applied to winding 247a without actuating winding 227 and arm 231. At the conclusion of the series of operations of arm 247c, when the measurements have been completed, a negative pulse of sufficient amplitude to break down diode 245 is applied thereto. As a result of this pulse, the latching of arm 237 by permanent magnet 238 is overcome and wiper 233 is removed from engagement with the winding of potentiometer 226.

In accordance with FIG. 19, a sensing device such as that shown in FIG. 14 can be used in surveying an oil or gas well 254, that is to say, for indicating and recording temperature, pressure or other ambient conditions therein. Cable 242 connects the remote potentiometer device to the indicating and recording equipment 255 at the surface location. With the arrangement which enables the wiper to be disengaged from the winding of the remote potentiometer, the transducer assembly can be left in the well for prolonged periods of time. Where it is necessary to take readings from the transducer only on a periodic basis, surface equipment 255 can be constructed as a portable unit. Thus, a single unit is then capable of reading the output of a plurality of transducer elements permanently installed in various wells.

In many cases, it is desirable to lower the instrumentation into the well, take readings and recordings of the output of the instrumentation, and then to remove the instrumentation. In such a case, the remote instrumentation is not subjected to the long term environmental conditions, which occur when the instrumentation is left in the well. The sensing device of FIG. 17 is adapted for the taking of measurements at remote locations, such as oil or gas wells, on a non-permanent basis. The assembly is mounted within inner housing 256 which is adapted to be installed in outer housing 257. The output shaft of the transducer (not shown) having rotary motion in response to the variable being sensed, such as the rotary motion of torque tube 208 in the transducer of FIG. 14, is inserted into opening 258a of clamp 258. Clamp 258 is connected by boss 259 to spring or resilient coupling 260 which is mounted upon spring washer 261. The resilient coupling is retained with respect to washer 261 by screws 263 which extend into and engage flange 264 of holder 265. With this arrangement, any one of the plurality of pressure or temperature transducers can be connected to clamp 258.

Resilient coupling 260 enables the transducer to operate freely with holder 265 even though some degree of misalignment may be present. Disc 266 serves to centralize and support the holder prior to and during assembly, but after assembly the disc operates clear of inner housing 256.

Wiper 267 which is biased against potentiometer winding 268 by cantilever support 269 operates in a manner similar to that described for wiper 233 in FIG. 14. With the construction shown in FIG. 17, it can be understood that pivot 270 extending into bushing 271 cannot only support holder 265 but also the upper portion of the transducer engaged with clamp 258. The assembly including the bushing and the potentiometer is positioned within inner housing 256 and secured thereto by set screw 272. The wiper 267 is long enough to allow axial motion from the transducer without adverse effects. Nut 273 hold the entire wiper assembly captive when the transducer i not attached. The nut never contacts bushing 271 while the gauge is operating. As clamp 258 is engaged to the transducer, the wiper is rotated to the approximate desired position on the resistance element 268 before tightening clamp 258. Bushing 271 which also carrie the resistance element is free to rotate when clamp screw 275 loosens sector 275a within the inside housing 256 The fine adjustment of the position of the wiper relative to the resistance element can be accomplished with screw driver in slot 275b. Clamp screw 275 can then b turned to fix the position of the resistance element.

Spacer 276 positions terminal plate 277 having termi nals 278 with respect to the bushing and pivot assembly Examples of circuits adapted for the assembly of FIG. 1 are those of FIGS. 3 and 16. Latching relay 49, as show in FIG. 16, is cylindrical in form in order to fit into cy lindrical inner housing 256. Contact arm 48a and contact 48b and 48c are mounted within sealed envelope 27 disposed within the center open portion of winding 49c In place of the circuit of FIG. 3, the arrangement c FIG. 17 can be provided with the circuit arrangemer of FIG. 18. The circuit of FIG. 18 enables choke 52, a shown in FIG. 3, to be eliminated. In the circuit of FIC 3, choke 52 prevents winding 49a of the relay from bein substantially short circuited when wiper 47a is at th extreme end portion of winding 47. In such a conditior but for the impedance of choke 52, the pulse being passe through Zener diode 53 would be short circuited by th potentiometer. In the circuit of FIG. 18 an impedanc such as resistor 280 is placed in circuit with winding 281 of magnetic latching relay 281. Permanent magnet 281 provides the latching function. Movable contact 281c adapted to alternately connect to a different end termina of the potentiometer 282 having winding 282a and wipe 282b. Zener diodes 283 and 284 are connected in a back-to-back arrangement across winding 281a connected to cable 285 and to return cable 286.

In operation, the application of a positive pulse to line 285 is capable of energizing winding 281a to actuate arm 281c into one of its positions. The impedance of resistor 280 prevents potentiometer 282 from short circuiting the pulse regardless of the position of wiper 282b. In order to cast arm 281c into its alternate position, a negative pulse is then applied to line 285, which is capable of breaking down diode 284. As a result, arm 281c is switched so that the sequential readings of potentiometer 282 can be accomplished at the remote indicator. The fact that resistance 280 is common regardless of the setting of arm 281c, it can be understood that the resistance does not disturb the accuracy with which the remote indicator can read or interpret the position of potentiometer 282. An arrangement similar to that of FIG. 18 is applicable to each of the previously described circuit arrangement of the invention, that is to say, it enables the requirement of the choke to be eliminated.

What is claimed is:

1. A system for indicating a change in resistance comprising resistance means having a pair of end terminals and an intermediate terminal connected thereto between said end terminals, the resistance between at least one of said end terminals and said intermediate terminal being variable in response to a condition, mechanical switch means for alternately connecting to a different one of said end terminals, means for indicating the condition of a circuit, a source of direct current in circuit with said resistance means and said indicating means, and means consisting of two wires with one of said wires connected to said intermediate terminal and the other wire connected to said switching means with both wires in circuit with said indicating means for serially connecting said intermediate terminal and said switching means to said indicating means, whereby upon a change in the resistance between at least one of said end terminals of said resistance means and said intermediate terminal and upon said indicating means being alternately connected to a different one of the end terminals of said resistance means by said switching means the change in resistance between the end terminals and the intermediate terminal being indicated by said indicating means.

2. A device according to claim 1 further comprising a relay including said mechanical switch, a transmission circuit extending from said switch and said intermediate terminal, said relay having a winding connected to said transmission circuit for actuating said switch to alternately connect said transmission circuit to different end terminals of said resistance means, and an electrical breakdown means in circuit with said winding, and connected across said transmission circuit for energizing said winding to actuate said switch in response to an electrical pulse, whereby said transmission circuit by being alternately connected to different end terminals of said resistance means enables the resistance between said intermediate terminal and said end terminals to be compared to sense the condition.

3. A system for indicating a condition comprising resistance means having a pair of end terminals and an intermediate terminal connected thereto between said end terminals, the resistance between at least one of said end terminals and said intermediate terminal being variable in response to the condition, mechanical switch means for alternately connecting to a different one of said end terminals, means for indicating the condition of a circuit, source of direct current in circuit with said resistance means and said indicating means and means consisting of two wires with one of said wires connected to said intermediate terminal and the other wire connected to said switch means with both wires in circuit with said indicating means and said source of direct current for serially connecting said intermediate terminal and said mechanical switch means to said indicating means whereby upon a change in the resistance between at least one of said end terminals of said resistance means as said indicating means is alternately connected to a different one of the end terminals of said resistance means by said mechanical switch means, the condition is indicated by said indicating means.

4. A system for indicating a change in resistance comprising first resistance means having a pair of first end terminals and a first intermediate terminal connected thereto between said first end terminals, the resistance between at least one of said first end terminals and said first intermediate terminal being variable in response to a condition, first mechanical switch means for alternately connecting to a different one of said first end terminals, second resistance means having a pair of second end terminals and a second intermediate terminal connected thereto between said second end terminals, the resistance between at least one of said second end terminals and said second intermediate terminal being variable, second switch means for alternately connecting to a different one of said second end terminals, means for serially connecting said first and said second intermediate terminals and said first and said second switch means, a source of direct current in circuit with said first resistance means and said second resistance means, and means for indicating the condition of the circuit connected by said connecting means as each of said first and second switch means are alternately connected respectively to different ones of said end terminals of said first and second resistance means, whereby upon a change in the resistance of one of said first and second resistance means, the other of said first and second resistance means can be varied to establish an adjusted resistance as indicated by said indicating means being connected by said connecting means for each of the alternate connections formed by said first and second switch means, the varying of the other of said first and second resistance means indicating the change in resistance in the one of said first and second resistance means in response to the condition.

5. A system for indicating a condition comprising first resistance means having a pair of first end terminals and a first intermediate terminal connected thereto between said first end terminals, the resistance between at least one of said first end terminals and said first intermediate terminal being variable in response to the condition, first mechanical switch means for alternately connecting to a different one of said first end terminals, second resistance means having a pair of second end terminals and a second intermediate terminal connected thereto between said second end terminals, the resistance between at least one of said second end terminals and said second intermediate terminal being variable, second mechanical switch means for alternately connecting to a different one of said second end terminals, means for serially connecting said first and said second intermediate terminals and said first and said second mechanical switch means, a source of direct current in circuit with said first resistance means and said second resistance means, and means for indicating the condition of the circuit connected by said connecting means as each of said first and second mechanical switch means are alternately connected respectively to a different one of the end terminals of said first and second resistance means, whereby upon a change in the resistance of one of said first and second resistance means, the other of said first and second resistance means can be varied to establish a predetermined resistance as indicated by said indicating means in the circuit connected by said connecting means for each of the alternate connections formed by said first and second mechanical switch means, the varying of the other of said first and second resistance means indicating the change in resistance in the one of said first and second resistance means and thereby indicating the condition.

6. A device for sensing two conditions comprising first resistance means having first end terminals and a first intermediate terminal, the resistance between at least one of said first end terminals and said first intermediate terminal being variable in response to a first condition, second resistance means having second end terminals and a second intermediate terminal, the resistance between at least one of said second end terminals and said second intermediate terminal being variable in response to a second condition, said first and said second intermediate terminals being connected to one side of an output circuit, a pair of switches, each switch of said pair being adapted to alternately connect to a different end of one of said first and said second resistance means, and an additional switch adapted to alternately connect to a different one of said pair of switches, said additional switch being connected to the other side of said output circuit, and means for activating said pair of switches and said additional switch in a predetermined sequence, whereby each portion between the end terminals and the intermediate terminal of said first resistance and said second resistance means can be applied to the output circuit in order to sense the two conditions.

7. A system for indicating a change in resistance of a device having resistance means with a pair of end terminals and an intermediate terminal connected thereto between said end terminals, the resistance between at least one of said end terminals and said intermediate terminal being variable in response to a condition, a mechanical switch for alternately connecting to a different one of said end terminals, and means connected to said resistance means and responsive to an electrical signal for actuating said switch, said system comprising additional resistance means having a pair of additional end terminals and an additional intermediate terminal connected thereto between said additional end terminals, the resistance between at least one of said additional end terminals and said additional intermediate terminal being varible, switch means for alternately connecting to a different one of said additional end terminals, said additional intermediate terminal of said additional resistance means being connected in circuit with said switch and said intermediate terminal of said resistance means, means connected to said switch means for applying said electrical signal to said actuating means, means for storing a charge, said charge-storing means being connected in circuit with said intermediate terminal of said resistance means and said switch means, and means for indicating the flow of current with respect to said charge-storing means as said switch and said switch means are actuated, whereby the charge of said charge-storing means indicates the charge of resistance of the resistance means.

8. A system for indicating a change in resistance of a device having a potentiometer with a pair of end terminals and a variable terminal connected thereto between said end terminals, a switch for alternately connecting to a different one of said end terminals, and means connected to said potentiometer means and responsive to an electical signal for actuating said switch, said system comprising an additional potentiometer having a pair of additional end terminals and an additional variable terminal connected thereto between said additional end terminals, first switch means for alternately connecting to a different one of said additional end terminals, said additional variable terminal of said additional potentiometer being connected in circuit with said switch and said variable terminal of said potentiometer, means connected to said first switch means for applying said electrical signal to said actuating means, a pair of capacitors, second switch means for alternately connecting each of said capacitors in circuit with said variable terminal of said potentiometer and said first switch means, and means for indicating the flow of current with respect to said capacitors as said switch and said first and second switch means are actuated, whereby the state of charge of said capacitors indicate the charge of resistance of the resistance means.

9. A system for indicating a change in resistance comprising resistance means having a pair of end terminals and an intermediate terminal connected thereto, the resistance between at least one of said end terminals and said intermediate terminal being variable, switching means for alternately connecting to a different one of said end terminals, means for indicating the condition of a circuit, means for serially connecting said intermediate terminal and said switching means to said indicating means, means for applying direct electrical potential to said resistance means to be utilized by said indicating means to determine a change of resistance in the circuit, and means actuatable by an electrical control signal, independent from the electrical potential, for causing said switching means to connect cyclically to at least one of said end terminals whereby a change in the resistance between at least one of said end terminals of said resistance means and said intermediate terminal is indicated by the indicating means sensing the electrical potential applied to said resistance means.

10. A device for sensing a condition comprising a resistance means having a pair of end terminals and an intermediate terminal connected thereto between said end terminals, the resistance between at least one of the end terminals and the intermediate terminal being variable in response to a change in the condition to be sensed, a relay having a switch adapted to be connected alternately to a different one of said end terminals, a transmission circuit extending from said switch and said intermediate terminal, said relay having a winding connected to said transmission circuit for activating said switch to alternately connect said transmission circuit to a different end terminal of said resistance means, and electrical break down means in circuit with said winding for energizing said winding to activate said switch in response to an electrical pulse, whereby said transmission circuit by being alternately connected between a different one of each end terminals and said intermediate terminal enables the resistance between the different end terminals and intermediate terminal of the resistance means to be compared to sense the condition.

References Cited

UNITED STATES PATENTS

| | | | |
|---|---|---|---|
| 1,581,957 | 4/1926 | Keller | 340—179 |
| 2,224,709 | 12/1940 | Uehling | 340—177 |
| 2,232,288 | 2/1941 | Uehling | 340—203 |
| 2,630,007 | 3/1953 | Howe | 340—177 |
| 1,665,397 | 4/1928 | Wunsch | 340—177 |
| 1,995,594 | 3/1935 | Wunsch | 340—177 |

FOREIGN PATENTS 400,289  11/1933  Great Britain.

THOMAS B. HABECKER, Primary Examiner

U.S. Cl. X.R.

340—183, 187, 210